J. G. JOHNSTON.
Paper-Fastener.

No. 198,200. Patented Dec. 18, 1877

WITNESSES

INVENTOR
James G. Johnston

UNITED STATES PATENT OFFICE.

JAMES G. JOHNSTON, OF WASHINGTON, D. C., ASSIGNOR OF ONE-HALF HIS RIGHT TO WILLIAM SICKELS, OF HAMILTON, MICH.

IMPROVEMENT IN PAPER-FASTENERS.

Specification forming part of Letters Patent No. 198,200, dated December 18, 1877; application filed October 29, 1877.

*To all whom it may concern:*

Be it known that I, JAMES G. JOHNSTON, of Washington, in the county of Washington, and in the District of Columbia, have invented certain new and useful Improvements in Paper-Fasteners; and do hereby declare that the following is a full, clear, and exact description thereof, reference being had to the accompanying drawings, and to the letters of reference marked thereon, making a part of this specification.

My invention relates to paper-fasteners; and it consists in two plates, of circular or other suitable form, each provided with a longitudinally-slotted lip or projection, to be locked together with the two plates on opposite sides of the papers to be fastened together, as will be hereinafter more fully set forth.

In order to enable others skilled in the art to which my invention appertains to make and use the same, I will now proceed to describe its construction and operation, referring to the annexed drawing, in which—

Figure 1:
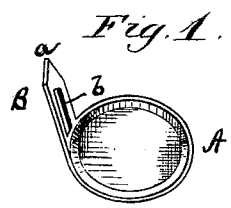
Figure 2:
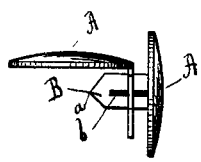
Figure 3:
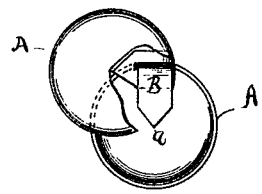

Figure 1 is a perspective view of one of the plates. Fig. 2 shows the two plates in position before they are clinched; and Fig. 3 is a similar view, showing the plates clinched.

A A represent two plates, of circular form, and of any desired dimensions, slightly concave or otherwise, as may be desired.

Each plate A is provided on one side with lip or projection B, formed with a longitudinal slot, $b$, and its end pointed, as shown at $a$. The lip B of one plate is forced through the papers to be fastened together, and the lip of the other plate then passed over the projecting lip on the other side of the papers, when the two lips are bent down, so as to clinch and fasten the two plates firmly on opposite sides of the papers, thereby holding the same securely together.

The plates A A may, of course, be made of any desired size and shape, and plain, or ornamented in any desired way. Ordinarily in paper-fasteners the head of the fasteners is on one side and the fastening device on the other; but in my invention it will be seen that there is a head on each side, and the fastening device is entirely concealed, which renders it neater in appearance, and also more difficult to remove when once fastened.

What I claim as my invention is as follows:

A paper-fastener composed of two plates, A A, each having a pointed lip or projection, B, with a longitudinal slot, $b$, to be locked or clinched together, substantially in the manner herein set forth.

In testimony that I claim the foregoing I have hereunto set my hand this 27th day of October, 1877.

JAMES G. JOHNSTON.

Witnesses:
FRANK GALT,
H. A. TOULMIN.